United States Patent Office 3,427,906
Patented Feb. 18, 1969

3,427,906
TEMPERATURE COMPENSATED MACHINE TOOL CROSS-SLIDE
Marcel H. Berly, Garches, France, assignor to H. Ernault-Somua, Paris, France, a French body corporate
Filed July 25, 1966, Ser. No. 567,668
Claims priority, application France, July 26, 1965, 25,969
U.S. Cl. 82—14                5 Claims
Int. Cl. B23b 3/28; B24b 7/20, 17/00

ABSTRACT OF THE DISCLOSURE

A duplicating type machine tool having a tool and a feeler at the ends of a cross-slide, and also having on the cross-slide a servo-control element connected by a drive mechanism to the feeler to be actuated by the latter. The cross-slide further carries a temperature compensating element of different expansion coefficient. A transmission means connects the compensating element to the drive mechanism to alter the action of the latter so as to compensate for temperature induced changes in the dimensions of the cross-slide.

---

The invention relates to remote control systems for copy-machine carriages, slides or the like, including the cross-slides of hydraulic copy lathes.

The movements of such cross-slides are controlled by a copy servo-control element connected to a feeler which senses a template in a direction transverse to the direction of cross-slide movement.

To explain the invention, reference will now be made to a particular example of a hydraulic lathe of the type comprising: a frame with a bed and, slidable thereon, a saddle bearing a cross-slide comprising a tool and a feeler; and a template supported by the frame in a general direction parallel to the direction of the axis of the centres between which the workpiece is mounted, such centres also being disposed on the frame, so that when the saddle advances on the bed, the feeler senses the template and acts, via a copy valve which is disposed on the cross-slide and which controls a hydraulic jack, to move the cross-slide in a manner such that the tool reproduces the profile of the template on the workpiece. As a rule, the tool is borne at one end of the cross-slide and the feeler is disposed at the opposite end of the cross-slide.

The applicants' French patent specification 1,234,197, filed on May 11, 1959, for "Copy-machine Tool" discloses means for ensuring that expansion of the various elements of the machine does not cause any slight shifting of the template axis relatively to the workpiece axis, so that the distance between the template and the workpiece as determined at setting-up always stays the same even after some time when the machine has heated up to its working temperature. However, the liquid of the hydraulic copy jack heats up while the machine is in operation, with the result that the cross-slide which bears the tool and the feeler experience relatively considerable expansion deformations which reduce the accuracy of the copy operation. More particularly, when the tool slide heats up, its length increases slightly and, if the feeler stays in contact with the template, the tool approaches the workpiece and therefore produces surfaces of undersized diameter.

It is precisely the object of the invention to obviate this disadvantage.

According to the invention, therefore, the connection between the feeler and the copy servo-control element comprises a drive or member movable relatively to the cross-slide and under the control of a compensating element which is also disposed on the cross-slide but has a different coefficient of expansion therefrom, the whole being so devised that variations in cross-slide length impart to the moving drive member movements such that the distance between the feeler and the tool point always stays the same, the copy servo-control element always being in its operative equilibrium position. This feature ensures that the distance between the cutting point of the tool and the feeler stays the same even though expansion varies the cross-slide length. This feature, particularly if combined with the features disclosed by the aforesaid French patent specification, leads to very accurate copy-machining.

In one embodiment, the feeler and the copy servo-control element being respectively connected to the two ends of a lever pivotally mounted at a place midway along the length thereof at one end of the cross-slide, the place of articulation of the lever is movable on the cross-slide in a direction parallel to the direction of cross-slide sliding, and is connected via an appropriate transmission to one end of a compensating rod whose coefficient of expansion differs from the coefficient of expansion of the cross-slide, the other end of such rod being rigidly connected to the other end of the cross-slide.

In one particular embodiment, the place of articulation of the lever connected to the feeler is borne by the crank pin of a crankshaft which is mounted in the cross-slide and which is rigidly connected to a crank articulated to the compensating rod.

The invention is illustrated by way of example in the accompanying drawings which shows an embodiment of an improved hydraulic copy lathe according to the invention and in which.

Figure 5:
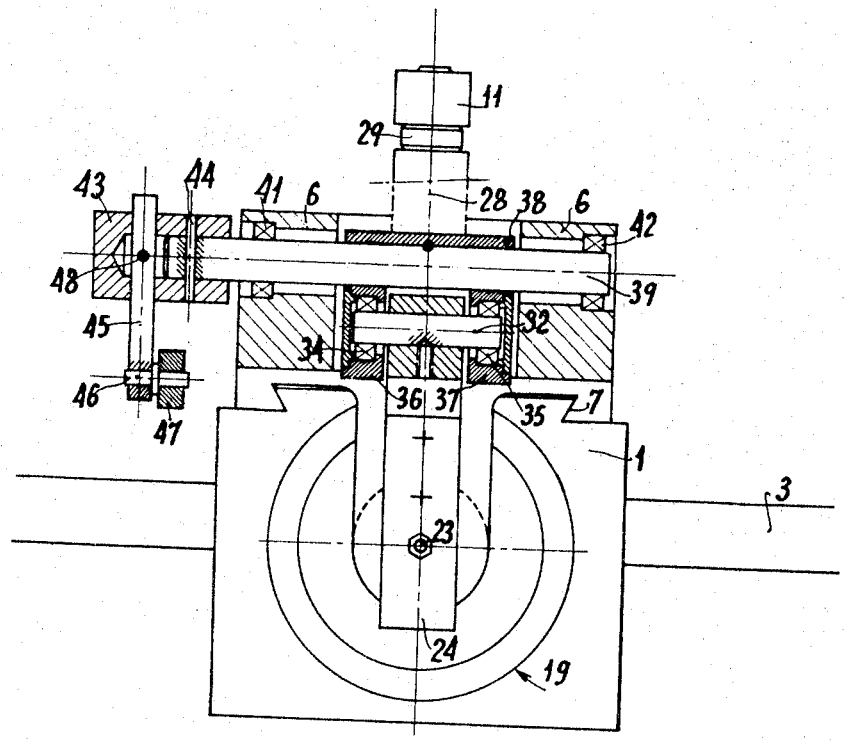
FIGURE 5 is a section on the line V—V of FIG. 1.
Figure 6:
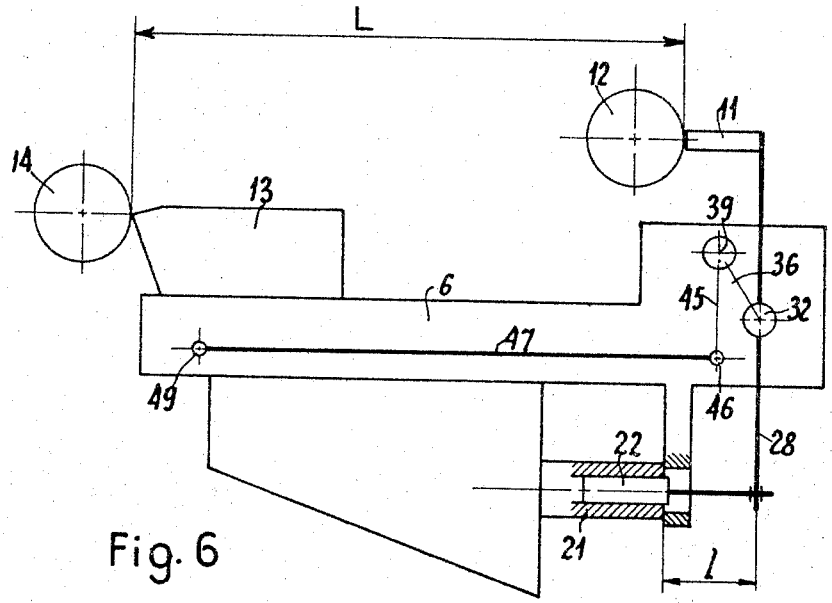
Figure 7:
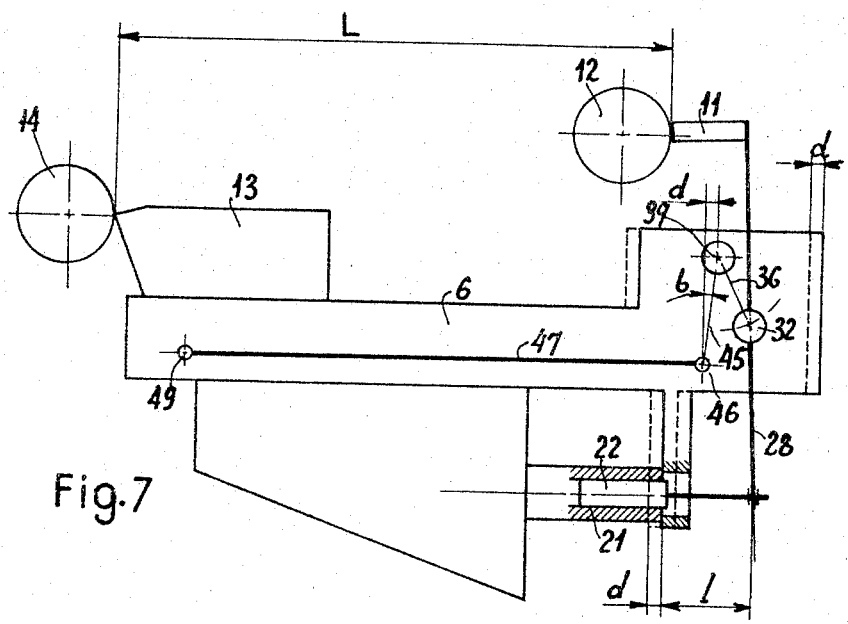

FIGURES 6 and 7 respectively show in diagrammatic form the system shown in FIGURES 1 to 5 but in the cold state and hot state.

A hydraulic copy lathe diagrammatically shown in the drawings comprises a saddle 1 (FIG. 1) slidable along two slides (only one, 3 of which is shown) of a bed 2, only some of which is shown. A cross-slide 6 having slide elements 7 can move on the saddle 1 in a direction transverse to the direction of the bed slides 3. The cross-slide 6 bears a feeler 11 adapted to sense a template 12, and a cutting tool 13 machining a workpiece 14. The template 12 and workpiece 14 are mounted on the machine frame with the interposition of appropriate elements such as are disclosed, for instance, by the aforesaid French patent specification. The cross-slide 6 can be moved on the saddle 1 by a hydraulic ram 19 which in the example shown is a differential device and whose piston 15 is secured to the cross-slide by screws 16 and whose cylinder 17 is rigidly connected to the saddle 1, the jack axis extending parallel to the direction of the cross-slide slide members 7. The hydraulic jack 19 is controlled by a copy valve 21 whose slide 22 is connected via a flexible metal rod 23 to a plate 24 secured by screws 25 to the bottom end of a drive comprising the lever 28 whose other end bears the feeler 11, with the interposition of a finger 29 rigidly secured in the lever 28, the feeler 11 being rigidly secured to the finger 29. The lever 28 is pivoted at some intermediate place along its length to a spindle 32 perpendicular to the direction of the slide members 7 and borne by the cross-slide 6. A helical compression spring 33 interposed between the inside surface of plate 24 and the cross-slide 6 biases the feeler 11 resiliently against the template 12. Orifices 21A, 21B of copy valve 21 are permanently connected to a pressure oil source and to a reservoir, respectively. For more details on the operation of this copy valve, reference can be made to U.S. Patent 3,188,896.

Everything hereinbefore described is conventional. According to the invention, the pivot spindle 32 is so disposed on the cross-slide 6 as to be movable thereon in a direction parallel to the direction of the slide members 7 of the cross-slide 6, and a transmission means is provide, connecting the said drive comprising the pivot 32 to a temperature compensating element on the cross slide and described below in detail. To this end, in the particular embodiment shown the spindle 32 is mounted, for instance, with the interposition of two ball or needle bearings 34, 35 (FIG. 5), respectively, in a transmission means comprising two cranks 36, 37 of a crankshaft 38 rigidly connected to a shaft 39 mounted with the interposition of two anti-friction bearings 41, 42 in the cross-slide, the latter bearings being in a direction perpendicular to the direction of the slide members 7 of the cross-slide 6.

Figure 1:
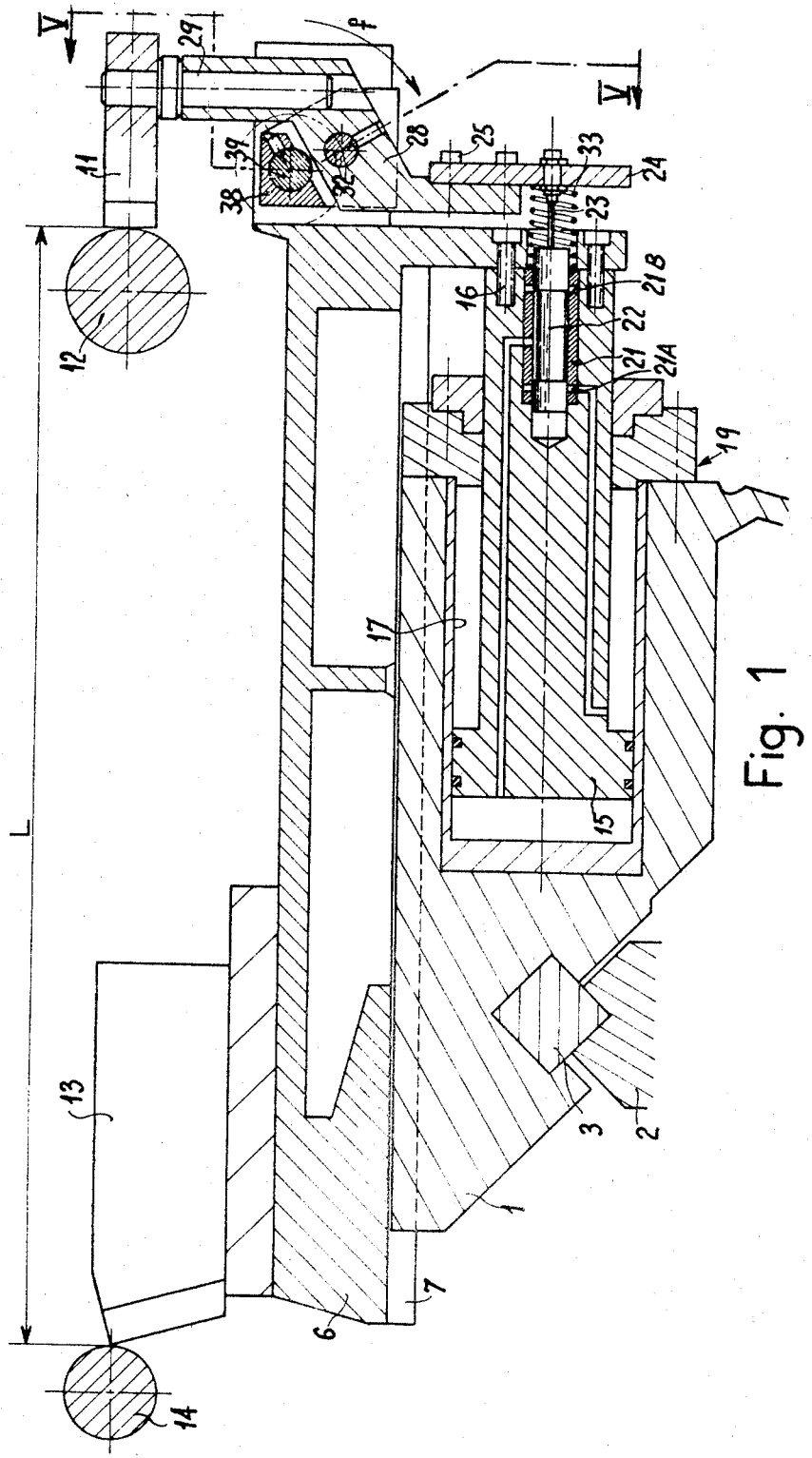
FIGURE 1 is a sectioned side elevation of the saddle and cross-slide of the copy lathe and of a hydraulic jack for operating the cross-slide, the machine being cold.
Figure 2:
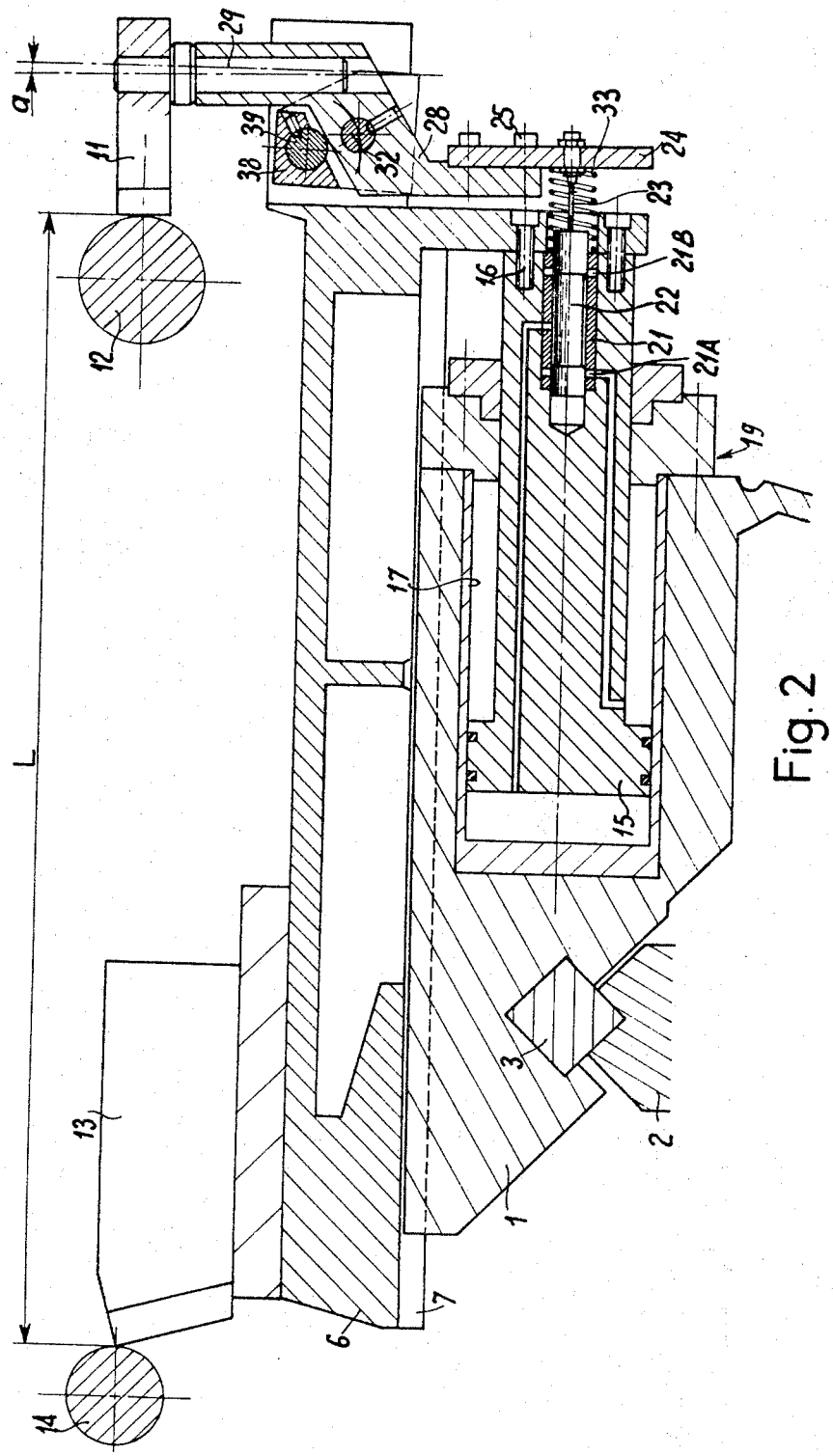
FIGURE 2 shows the same elements as in FIGURE 1 but after the cross-slide has expanded.
Figure 3:
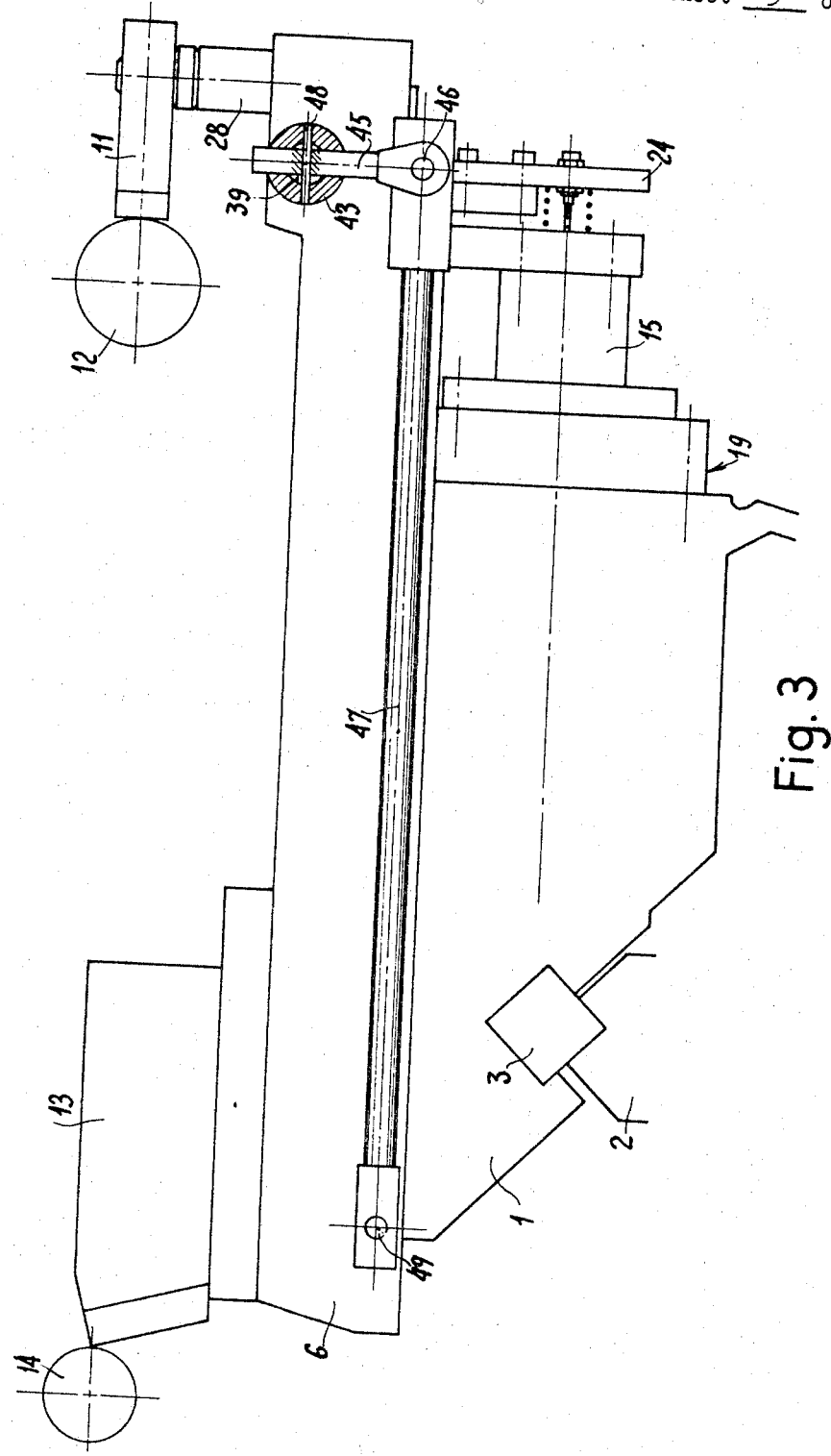
FIGURE 3 is a view in external side elevation of the saddle and cross-slide when cold.
Figure 4:
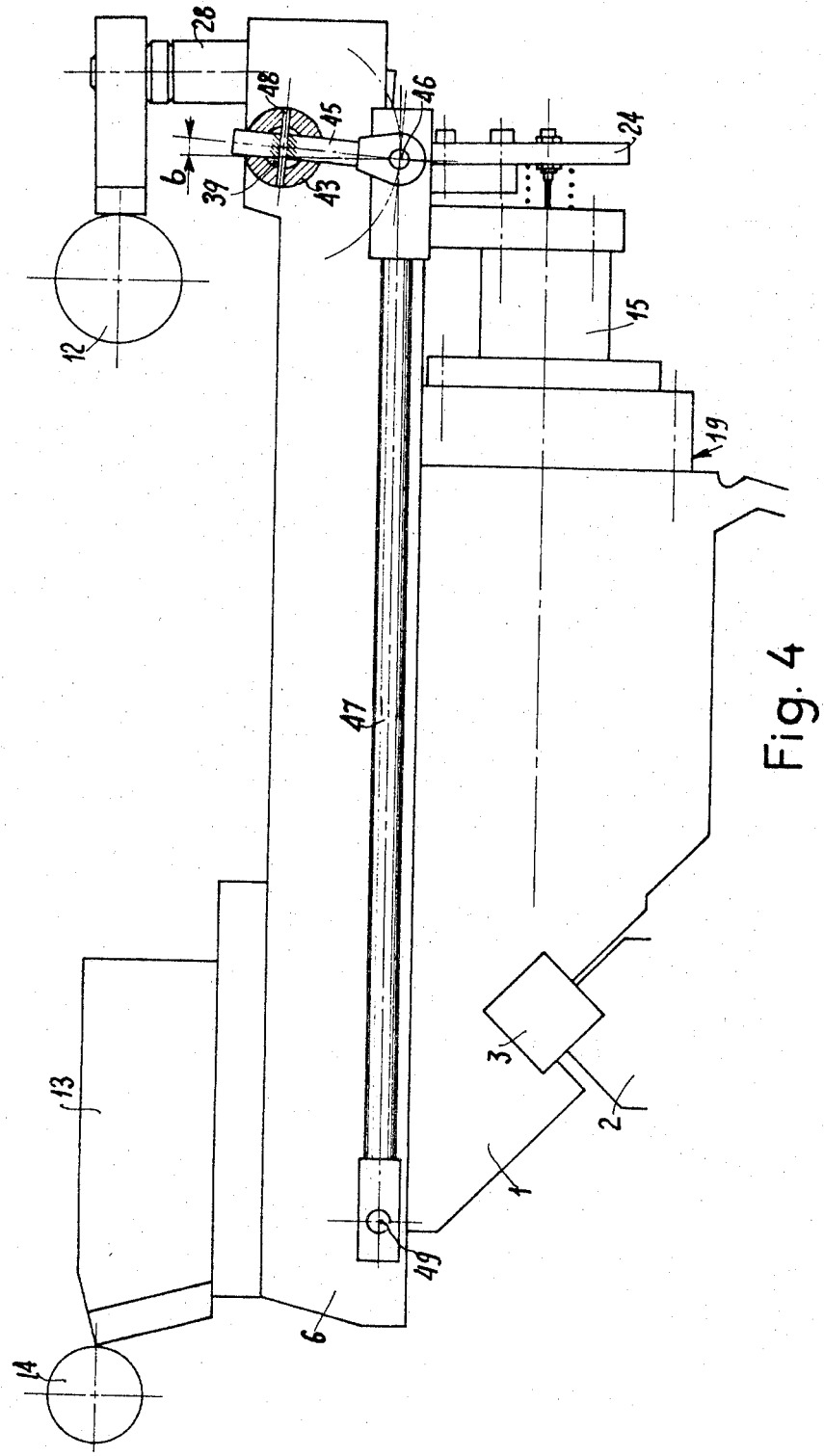
FIGURE 4 is a view similar to FIGURE 3 but showing the same elements after expansion of the cross-slide.

Secured to one end of the shaft 39 is a hub 43 bearing a crank 45 having a button or the like 46 to which is articulated one end of a compensating element or rod 47 extending over the whole length of the cross-slide 6 and articulated at its other end to a spindle 49 rigidly connected to the cross-slide (FIGURES 3 and 5). The hub 43 is secured to the shaft 39 by a pin 44. The crank 45 can slide in the hub 43, so that its effective length can be very accurately adjusted by trial and error, whereafter it is locked in the hub 43 by a pin 48.

The compensating rod 47 is made of a material whose coefficient of expansion differs from the coefficient of expansion of the cross-slide 6; in this particular example the coefficient of expansion of the rod 47 is almost zero. The crank 45 extends downwards and the spindle 32 is below the axis of the shaft 39, so that when the cross slide 6 elongates because of expansion, the action of the said drive, acting on the copy servo-element, is automatically altered because the lever 28 pivots in the direction indicated by an arrow $f$ in FIG. 1—i.e., clockwise when looking at FIG. 1. The transmission means controls the position of the spindle or pivot 32 with respect to the front end of the cross-slide.

FIGS. 6 and 7 are diagrammatic views of the main items hereinbefore described but when the cross-slide is cold and hot, respectively, like elements having the same references as in FIGS. 1–5.

To explain how the system operates, reference will first be made to FIGS. 6 and 7. When the machine is cold and assuming that all the elements have been adjusted and the tool 13 is in contact with the workpiece 14 to be machined and the feeler 11 is in contact with the template 12, slide member 22 of copy valve 21 is in its neutral equilibrium position corresponding, for instance, to the bottom end of the lever 28 being at a distance "$l$" from the cylinder of copy valve 21 (FIG. 6). To make the reasoning easier to follow, it will be assumed that the spindle 32 is positioned substantially halfway along the length of the lever 28 and that the radius of the cranks 36, 37 of the crankshaft 38 is equal to half the length of the crank 45 which provides the coupling with the compensating rod 47. The distance between the tool cutting point and the place where the feeler 11 contacts the template 12 is L. It will be assumed that after a period of operation the oil of the copy jack 19 has heated up to an extent such that the length of the cross-slide 6 has increased by an amount $d$ which will be taken, for convenience in the argument, to be 0.2 mm. The expanded cross-slide is shown in solid line in FIG. 7, the chain lines therein denoting its cold shape as shown in FIG. 6.

Because of the very nature of hydraulic copy systems, the slide member 22 of the copy valve is always in the same neutral equilibrium position in the cylinder 21. Consequently expansion of the cross-slide has shifted the slide member 22, together with the cylinder, by 0.2 mm. to the right in FIG. 7 relatively to the frame of the machine and to the template. However the feeler 11 has stayed in contact with the template, so that the centre of the lever 28—i.e., its pivot spindle 32 would have needed to shift by 0.1 mm. to the right relatively to the machine frame. The crankshaft axis 39 has shifted to the right by 0.2 mm., whereas its crank button or knob 46 retained by the compensating rod 47 has not moved. The crankshafts are therefore pivoted on the cross-slide through an angle $b$ and the spindle 32 has shifted to the left by 0.1 mm. relatively to the cross-slide, while simultaneously having shifted to the right by 0.1 mm. relatively to the machine frame, since this part of the cross-slide has shifted to the right by 0.2 mm. relatively to the frame. This is precisely the condition which it is required to meet.

The figures given for the expansions and relations of the lever arms mentioned are merely examples chosen amongst simple numbers to facilitate reasoning and do not take account of the various obliquities of such elements; clearly, however, the mechanism can readily be adapted to suit kinematic requirements and provide substantially complete compensation. For instance, the movements of the compensating rod 47 are of negligible amplitude so that the rear end of the rod 47 could very well be rigidly connected to the cross-slide 6 instead of being articulated thereto by a spindle 49.

I claim:
1. In a duplicating type machine tool, in combination:
  (a) a cross-slide having adjacent its two ends respectively a feeler adapted to engage a template and a tool,
  (b) a copy servo-control element carried by the cross-slide,
  (c) a drive carried by the cross-slide, connecting the servo-control element to the feeler for actuation thereby,
  (d) a compensating element carried by the cross-slide, said element and cross-slide having different coefficients of expansion, and
  (e) transmission means connecting said compensating element and said drive, whereby the action of the latter is automatically altered as the temperature of the cross-slide changes, thereby to alter the actuation of the servo-control element by the feeler so as to maintain constant the distance between the feeler and tool as the servo-control element is maintained always in its operative equilibrium position.
2. The combination of claim 1, wherein:
  (a) the said drive comprises a pivot movably mounted on one end of the cross-slide and a lever swingable about the pivot and having its ends respectively connected to the feeler and copy servo-control element,
  (b) said compensating element comprising a rod which is at one end rigidly connected to the other end of the cross-slide and which extends along the latter toward the said one end,
  (c) said transmission means connecting the other end of said rod to the said pivot to control the position thereof with respect to said one end of the cross-slide.
3. The combination of claim 2, wherein:
  (a) the transmission means comprises:
    (1) a shaft mounted on the said one end of the cross-slide,
    (2) a crank on said shaft, articulated to said other end of the compensating rod,
  (b) said pivot comprising a crankpin on said shaft, rigid with said crank.

4. The combination of claim 3, wherein:
 (a) means are provided for slidably mounting said crank on the crankshaft for adjustment relative thereto.
5. The combination of claim 1, and including:
 (a) a machine bed,
 (b) a saddle carried by the bed, on which the cross-slide is carried and on which it travels,
 (c) a hydraulic jack carried by the saddle and connected with the cross-slide to shift the same under the control of the copy servo-control element,
 (d) a template mounted on the machine bed, engaged by said feeler, and
 (e) spring means on the cross-slide, engageable with said drive for maintaining the feeler in engagement with the template.

References Cited

UNITED STATES PATENTS 3,166,962 1/1965 Le Lan _____ 82—14
3,252,362 5/1966 Forster et al. _____ 82—14

GERALD A. DOST, *Primary Examiner.*

U.S. Cl. X.R.

51—100, 165